J. W. AYLSWORTH.
PHONOGRAPH RECORD AND PROCESS FOR MAKING THE SAME.
APPLICATION FILED MAY 25, 1909.
1,043,389.
Patented Nov. 5, 1912.
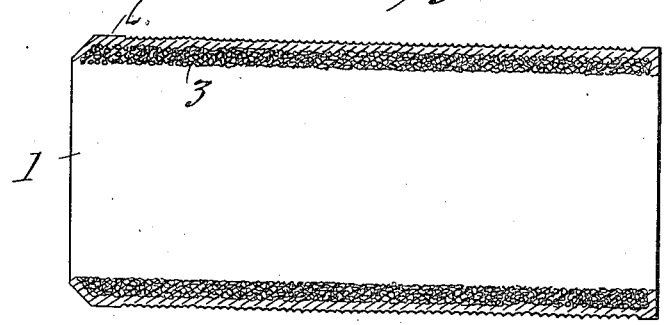
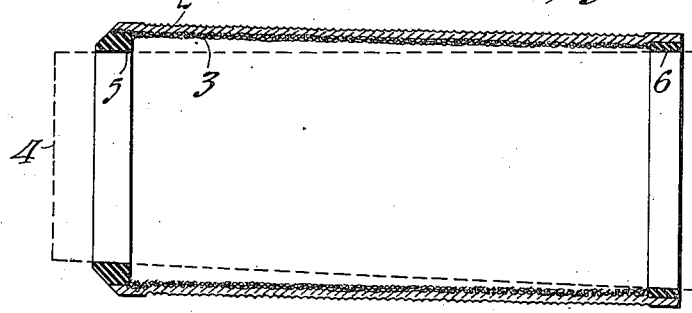

UNITED STATES PATENT OFFICE.

JONAS W. AYLSWORTH, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

PHONOGRAPH-RECORD AND PROCESS FOR MAKING THE SAME.

1,043,389.   Specification of Letters Patent.   Patented Nov. 5, 1912.

Application filed May 25, 1909. Serial No. 498,357.

*To all whom it may concern:*

Be it known that I, JONAS W. AYLSWORTH, a citizen of the United States, and a resident of East Orange, Essex county, New Jersey, have made a certain new and useful Invention in Phonograph-Records and Processes for Making the Same, of which the following is a description.

This invention relates to a novel form of a phonograph record and method of producing the same centrifugally, the record being claimed in this application and the method in a divisional application, Serial No. 719,094, filed September 7, 1912.

The object of my invention is to produce a light weight strong cylindrical phonograph record, which will have a hard resisting surface smooth and free from defects and a porous backing of a similar substance which will contribute mechanical strength and acoustic solidity without the use of as much material as would be necessary if the record were made solid or backed with solid material.

The result above referred to is accomplished by casting in a rotating mold a composition containing ingredients which cause the same to foam excessively or evolve gases during the formation of the record to cause the same to be spongy and porous, while the outer record surface of the same which is in contact with the mold will be free from bubbles and similar defects.

More specifically, my invention is accomplished by casting in the manner referred to a record of a composition, the ingredients of which react on sufficient application of heat to form a hard infusible condensation product. In my present invention, a composition of this character is made use of in which the ingredients are so chosen and proportioned as to cause excessive foaming or the evolution of dissociation gases during the transition of the material from the molten plastic state to a solid plastic or non-plastic state, the product, caused by the evolution of such gases, being porous and spongy throughout its mass, while the record surface thereof is smooth and free from bubbles.

A composition such as that described may be made by adding an excess of paraformaldehyde, di- or tri- oxymethylene, or other suitable aldehyde to a composition having a formula such as Formula No. 1 in my application No. 496,060 for plastic composition and process of manufacturing the same, filed May 14, 1909. The formula referred to is:—(1.) Phenol resin 100 parts by weight, polymerized formaldehyde 5 to 7 parts by weight, benzoic anhydrid 5 to 10 parts by weight.

The excess of polymerized formaldehyde above the proportion in the foregoing formula causes the mass to foam during the transition from the molten plastic to the hard solid condition. With such a composition the surface next to the record surface of the mold is formed in a thin layer of material free from porosity. The thickness of such layer may be controlled at will by pouring in the mold first an amount of a mass so constituted that it will not foam while changing from the molten plastic to a non-plastic or a solid condition, subsequently pouring in the mold the mass which is designed to foam or evolve dissociation gases whereby the porous backing or body of the record is formed.

Attention is hereby directed to the accompanying drawings, forming part of this specification, in which—

Figure 1 represents a longitudinal cross section through a record made in accordance with my invention, and Fig. 2 is a longitudinal cross section through a similar record formed with bearing rings and shown mounted on the taper mandrel which is shown in dotted lines.

Referring to the drawings, the record 1 is formed having a smooth hard non-porous outer surface 2 and a porous spongy backing or body portion 3. In Fig. 2, a record of this character is shown mounted on the taper mandrel 4, the record being formed with suitable bearing rings 5 and 6. A record similar to that disclosed in Fig. 2 may be formed by casting the record material in a rotating mold in which bearing rings of hard rubber or other suitable material or of the final condensation product of a resinized phenol have been secured in position previous to the pouring of the record, in the manner disclosed in my application No. 493,053, filed April 29, 1909.

As is well known, the reaction between a phenol and an aldehyde is accompanied by the evolution of dissociation gases unless a counteracting pressure is employed. In the case of the process described and claimed in this application, the speed of rotation of the mold is insufficient to generate a counteracting pressure due to the centrifugal action sufficient to counteract the evolution of gases with substances in the proportions used.

In the formula above referred to as Formula No. 1 in my application No. 496,060, a certain proportion of benzoic anhydrid is included, this being an element which I denote a "final product solvent element" since it has the quality of combining or entering into solution with the other ingredients at an elevated temperature, causing the product to become somewhat plastic and free from internal stresses at such temperature, and forming a solid solution with the other ingredients of the product when cold. This material or materials having similar properties, as described in my above mentioned application, may be used or not as desired, in the spongy record composition here described and claimed.

The benzoic anhydrid in addition to being a "final product solvent element" is also a "water combining element", as described in my application Serial No. 496,060 referred to, that is, it has the properties of combining during the reaction with any traces of water which may be contained in the substance. Any other substance, such as various anhydrids of organic acids, may be used as an ingredient in the composition, to perform the same function if desired. Also it is to be understood that I am not limited to the substances in proportions referred to in the above mentioned formula, but that various combinations of phenols and aldehydes in various proportions may be used with good results so long as the proportion of aldehyde is sufficient to cause the evolution of gases in the mass during the formation of the record at the speed of rotation necessary to form the record.

While I have described my invention specifically in connection with phenol condensation products, it is to be understood that I am not necessarily limited thereto. For example, a celluloid record may be formed having the general characteristics of my invention. In practicing the invention with this substance, a thin film of celluloid is first formed on the bore of the record from a suitable solution by evaporating away the solution to form a non-porous outer surface for the record cylinder. A further solution of celluloid is then introduced into the rotating mold and evaporation carried on more quickly than in the formation of the outer film, to cause foaming of the substance during the evaporation and the consequent formation of the spongy celluloid body or backing.

Having now described my invention, what I claim and desire to protect by Letters Patent is as follows:

1. As a new article of manufacture, a phonograph record formed of a hard infusible resinized phenol condensation product having an outer record surface smooth and non-porous, the remainder of the record body being spongy and porous, substantially as described.

2. As a new article of manufacture, a phonograph record formed of a hard homogeneous substance, non-plastic at ordinary temperatures, having a smooth non-porous record surface and a rigid porous spongy body, substantially as described.

3. As a new article of manufacture, a phonograph record having a hard, smooth resisting insoluble and infusible record surface and a porous spongy backing of the same material, substantially as described.

4. As a new article of manufacture, a phonograph record formed of a hard homogeneous substance, non-plastic at ordinary temperatures, having a smooth non-porous record surface and a rigid porous body of light weight, substantially as described.

This specification signed and witnessed this 22nd day of May, 1909.

JONAS W. AYLSWORTH.

Witnesses:
 DYER SMITH,
 JOHN M. CANFIELD.

It is hereby certified that in Letters Patent No. 1,043,389, granted November 5, 1912, upon the application of Jonas W. Aylsworth, of East Orange, New Jersey, errors appear requiring correction as follows: In the grant and in lines 6-7, page 1, title of invention, for "Phonograph-Records and Processes for Making the Same" read *Phonograph-Records;* and in the heading to the drawing and to the printed specification, for "Phonograph-Record and Process for Making the Same," read *Phonograph-Record;* and that the said Letters Patent should be read with these corrections therein that the same may conform to the record of the case in the Patent Office.

Signed and sealed this 10th day of December, A. D., 1912.

[SEAL.]

C. C. BILLINGS,
*Acting Commissioner of Patents.*